United States Patent [19]
de Buhr et al.

[11] 3,984,663
[45] Oct. 5, 1976

[54] SIGNAL MAXIMUM OR MINIMUM SEEKING CIRCUIT

[75] Inventors: Alfred P. de Buhr, Downers Grove; Bruce R. Meyer, Western Springs, both of Ill.

[73] Assignee: General Motors Corporation, Detroit, Mich.

[22] Filed: Dec. 18, 1974

[21] Appl. No.: 534,077

[52] U.S. Cl. .................. 235/150.1; 235/92 MP; 318/561
[51] Int. Cl.² ................................. G05B 13/00
[58] Field of Search ......... 235/150.1, 92 MP, 151.1; 318/561, 636

[56] References Cited
UNITED STATES PATENTS

| | | | |
|---|---|---|---|
| 2,628,606 | 2/1953 | Draper et al. | 235/150.1 |
| 2,687,612 | 8/1954 | Anderson et al. | 235/150.1 |
| 2,972,446 | 2/1961 | White | 235/150.1 |
| 3,089,474 | 5/1963 | Lewis et al. | 235/150.1 |
| 3,309,507 | 3/1967 | Schlein | 235/150.1 |
| 3,548,169 | 12/1970 | Togneri | 235/92 MP |
| 3,578,957 | 5/1971 | Gatlin | 235/150.1 |
| 3,767,900 | 10/1973 | Chao et al. | 235/150.1 |
| 3,781,626 | 12/1973 | Kubo et al. | 318/561 |

*Primary Examiner*—Malcolm A. Morrison
*Assistant Examiner*—Errol A. Krass
*Attorney, Agent, or Firm*—Warren D. Hill

[57] ABSTRACT

In a feedback control circuit, a circuit maximizes or minimizes a controlled signal by incrementally varying the controlling signal in one sense, determining the direction of controlled signal change in response to such variation, and then incrementally varying the controlling signal in the same or the opposite sense in accordance with such direction. A condition of the system is that the controlled signal must reach a maximum or minimum in the range of the controlling signal. For illustration, the circuit is described in an analog-digital form applied to a wheel slip control of an electric locomotive to adjust the motor current to a maximum value to obtain the peak tractive effort that the rail conditions will permit.

4 Claims, 6 Drawing Figures

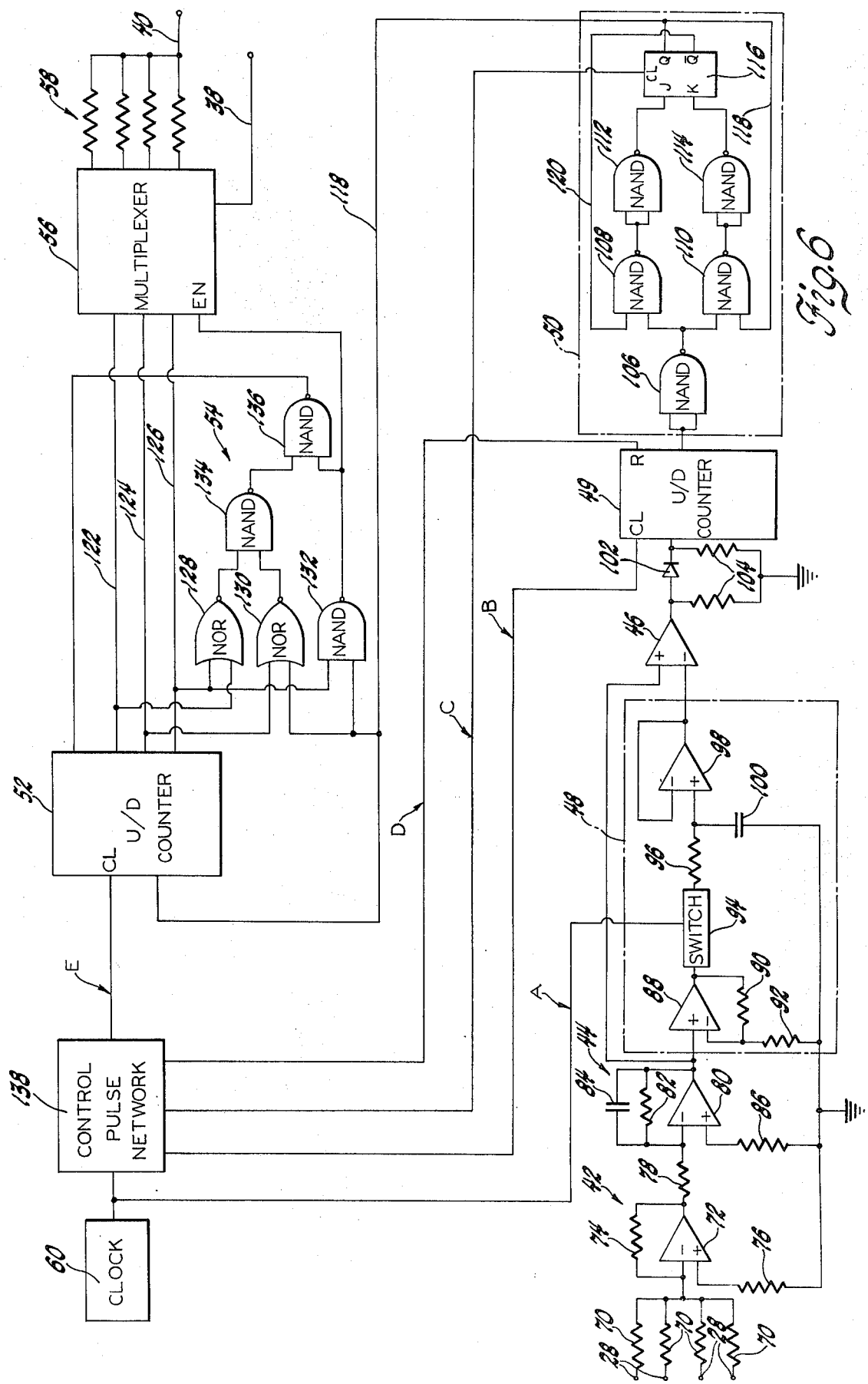

SIGNAL MAXIMUM OR MINIMUM SEEKING CIRCUIT

This invention relates to a circuit in a control for maximizing or minimizing a controlled signal which reaches a maximum or minimum over the range of a controlling signal. It is particularly applicable to a control system for a variable that has a maximum or minimum value that varies with operating conditions or otherwise that cannot be known in advance. Such value, whether a maximum or a minimum, is hereinafter termed the "optimum".

It is therefore a general object of this invention to provide a control circuit effective to vary a controlld parameter in response to a controlling signal in a direction to optimize the controlld parameter and thereafter to maintain the controlld parameters at or near its optimum value.

The invention is carried out in a controller in which a circuit senses the direction of change of the controlled parameter for a predetermined change in the controlling parameter and a circuit responsive to such direction changes the controlling signal in the direction required to optimize the parameter or hold it at substantially its optimum value once it is attained.

The invention further contemplates a sample and hold circuit and a comparator to determine the direction of change of the controlled parameter over short time periods, an up/down counter for accumulating the direction over each of several periods to establish the long term direction of the controlled parameter value and a logic circuit determining the direction of change of the controlling signal which is required to optimize the controlled parameter.

The above and other advantages will be made more apparent from the following specification taken in conjunction with the accompanying drawings wherein like reference numerals refer to like parts and wherein;

FIG. 6 is an electrical schematic diagram for the optimizing circuit of FIG. 4 according to the invention.

Figure 1:
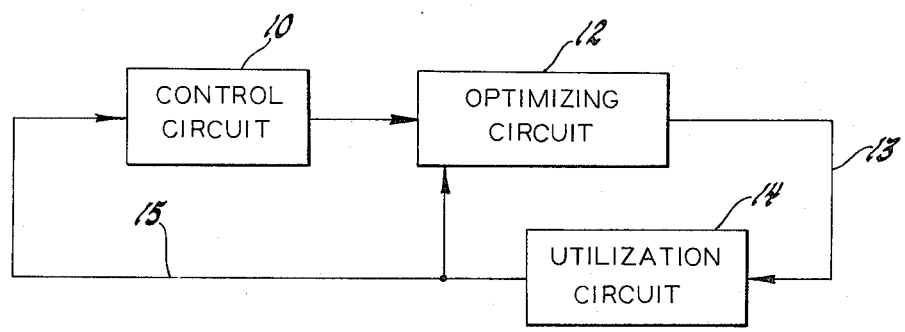
FIG. 1 is a block diagram for a general system utilizing an optimizing circuit according to the invention.
Figure 2:
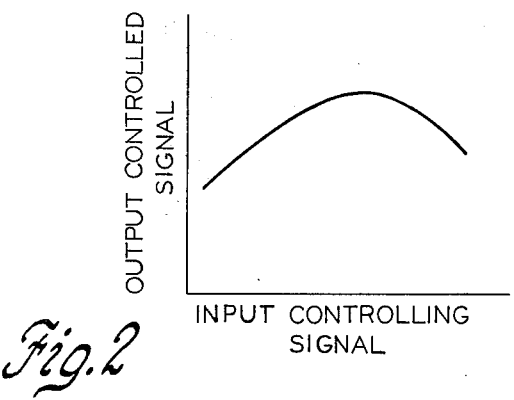
FIG. 2 is a diagram illustrating a typical relationship between a controlled signal and a controlling signal in FIG. 1.

The specific embodiment of the invention described herein is directed to a control system for maximizing the motor current of a diesel electric locomotive subject to a wheel slip limit control, however, it is to be emphasized that the invention is not limited to such an application and may be used to minimize a given parameter as well as to maximize a parameter. The invention is applicable to any feedback control circuit in which the output of the optimizing circuit can execute a change in the controlled signal that is then are reflected through feedback to the input of the optimizing circuit. Such a general arrangement is shown in FIG. 1 in which a control circuit 10 produces a control signal which is modified by an optimizing circuit 12 to produce a controlling signal on line 13 which is fed to a utilization circuit 14. An output controlled signal on line 15 is proportional to the parameter of the utilization circuit which is to be optimized and is fed back to the input of the control circuit 10 as well as to the optimizing circuit 12. In the general case, it is not essential that the controlled signal on line 15 be fed to the control circuit 10 since the control circuit 10 may be responsive to some other system parameter. A condition of the system is that the output control signal on line 15 must reach a maximum value as shown in FIG. 2 or a minimum value over the range of the input controlling signal.

Figure 3:
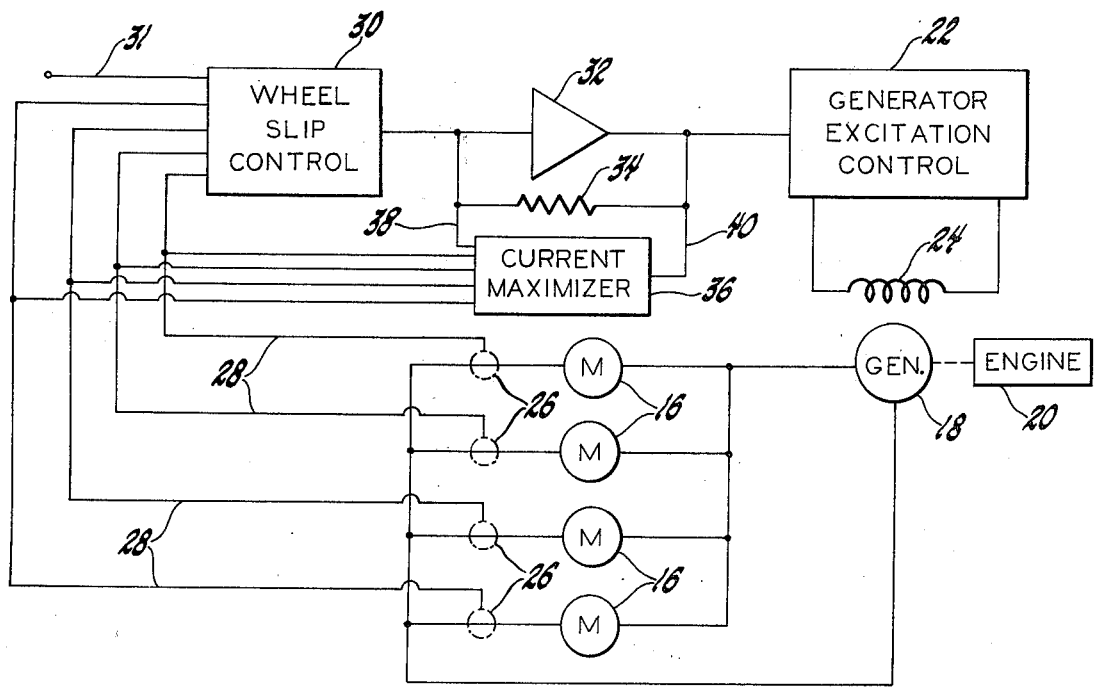
FIG. 3 is a combined block and schematic diagram of a diesel electric locomotive wheel slip control system in which a maximizer circuit according to the invention is utilized.

The application of this invention to a diesel electric locomotive is illustrated in FIG. 3 wherein a plurality of series traction motors 16 arranged in parallel receive current from a generator 18 driven by an engine 20. A generator excitation control 22 supplies an excitation winding 24 of the generator to control the generator output. Transducers 26 detect the current of each motor 16 and provide signal proportional thereto on lines 28 which are connected to a wheel slip control 30. The wheel slip control 30 responds to the several motor currents and a train speed signal on line 31 to limit the percentage slip of the wheels associated with the traction motors so that the percentage of wheel slip will be near that required for maximum traction between the wheels and the rail. The wheel slip control 30 is not described in detail since it forms no part of this invention but is merely illustrative of an application of the optimizing circuit. That percentage of slip is variable, however, depending upon the condition of the rail, whether it is wet or dry, etc. However, since the total traction motor current is generally proportional to a tractive effort, the peak tractive effort within the limitations of a particular control system may be achieved by maximizing the motor current. This is achieved by modifying the control signal from the wheel slip control 30 through a gain control comprising an operational amplifier 32 with a feedback resistor 34 to set the maximum gain and a current maximizer 36 connected in parallel with the feedback resistor 34 through lines 38 and 40 to alter the gain of the gain control to optimize the control signal on lines 28 which are fed to the current maximizer 36. The output of the operational amplifier 32 then provides the controlling signal to the generator excitation control 22. Thus the wheel slip control 30 is effective to control the motor current to the proper range to obtain maximum traction and the current maximizer 36 is effective to further modify the motor current to obtain its peak value.

Figure 4:
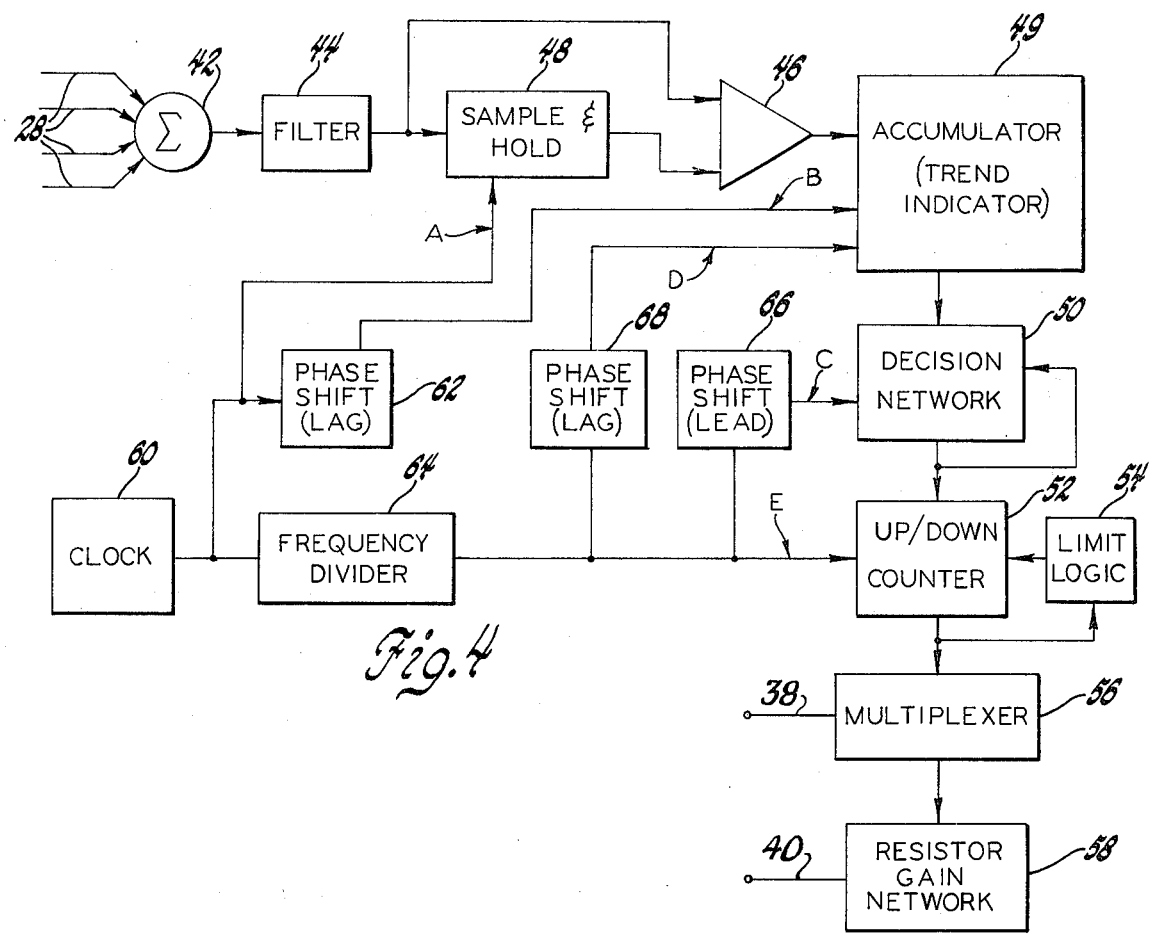
FIG. 4 is a block diagram of an optimizing circuit according to the invention.
Figure 5:
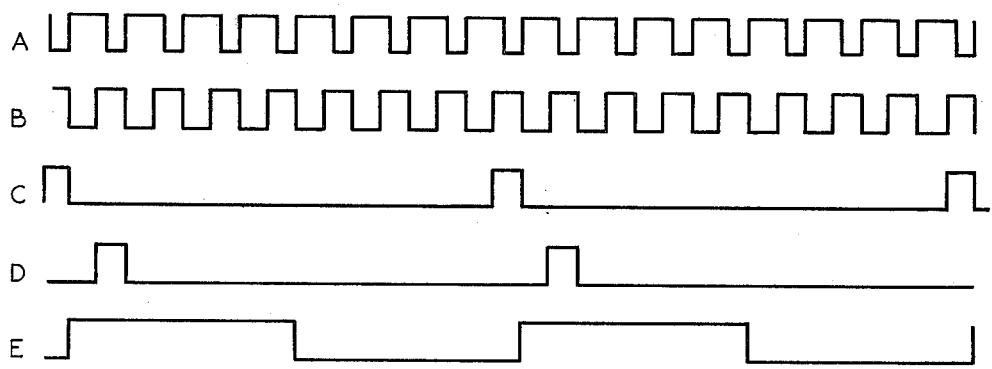
FIG. 5 is an illustration of wave forms in the clock pulse network of the circuit of FIG. 4.

The current maximizer 36 is shown in the form of a block diagram in FIG. 4. The motor current signals on lines 28 are fed to a summer 42, the output of which is fed through a filter 44 to a comparator 46 and a sample and hold circuit 48 which in turn has its output connected to the comparator 46. The comparator output is fed to an accumulator 49 which supplies the input to a decision network 50. The output of the decision network 50 is fed to an up/down counter 52 which is limited in operation by a limit logic circuit 54. The output of the up/down counter 52 is fed to a multiplexer 56 which controls a resistor gain network 58. The sequence of operation is controlled by a clock pulse network providing the pulse form shown in FIG. 5. A clock 60 produces a pulse train A connected to the sample and hold circuit 48 to periodically trigger that circuit to register a new sample of the motor current value. A phase shift circuit 62 responsive to the pulse train A produces a similar but lagging pulse train B which is fed to the accumulator 49 to cause the accumulator to periodically read the comparator output. A frequency divider 64 produces a pulse train E having pulses of long duration (encompassing eight pulses of pulse train A) which are fed to the up/down counter 52. A phase shift circuit 66 produces short pulses C leading the rising pulses of pulse train E for triggering operation of the decision network 50 while a phase shift circuit 68 produces short pulses D lagging the rising pulses of pulse train E and are fed to a reset terminal of the accumulator 49.

In operation the sample and hold circuit in response to the clock pulses A periodically samples the motor current and memorizes that value. The comparator 46 compares that value with the instantaneous value of the motor current to produce a binary output indicating whether the direction of change of motor current is increasing or decreasing. The clock pulse B then causes the accumulator 49 to periodically register the comparator output and algebraically combines it successively for eight time periods to establish a trend of current change. After the eight periods have been accumulated, the pulse C causes the decision network 50 to read the accumulator output which will indicate an increasing or a decreasing trend, then the pulse D will reset the accumulator to begin another trend measurement. A decision network 50 is a logic circuit which decides whether the maximizer output should change in the increasing or decreasing direction. When the accumulator output reveals an increasing trend, the decision network will request a change in the same direction as the previous change. When the trend indicates a decreasing motor current, the decision network requests a change in the direction opposite of the previous change. Just after the decision is made, pulse train E causes the up/down counter 52 to register the output of the decision network and directs the multiplexer 56 to accordingly alter the resistance of the resistor gain network 58. Then the entire cycle repeats to produce a new decision for change according to the influence of the previous change. The limit logic circuit 54 prevents the up/down counter 52 from going beyond its allowable range which is determined by the number of resistors available in the resistor gain network 58.

The schematic diagram of the current maximizer circuit is shown in FIG. 6. The lines 28 carrying the motor current signals are each fed through a resistor 70 to the negative input of an operational amplifier 72 having a feedback resistor 74 and having its positive terminal connected to ground through a resistor 76. Those elements 70 through 76 comprise the summer 42. The summer output is fed through resistor 78 to the filter 44 which comprises an operational amplifier 80 with a feedback resistor and capacitor 82 and 84 respectively, connected between its output and negative input terminal while the positive inut terminal is connected to ground through a resistor 86. The filter output is connected to the sample and hold circuit 48 having as its input the positive terminal of an operational amplifier 88 which serves as a buffer amplifier and which has its output connected through a feedback resistor 90 to the negative terminal thereof and has a further resistor 92 connected from the negative terminal to ground. The output of the amplifier 88 is fed through an analog switch 94 controlled by the pulse train A from the clock 60 and through a resistor 96 to the positive input of an operational amplifier 98. The positive input terminal is connected through a memory capacitor 100 to ground while the negative input terminal of the amplifier is connected to its output. In operation the switch 94 is closed during the down pulse of pulse train A and open during the up pulse. Thus during the down pulse the capacitor 100 is charged through the operational amplifier 88 and the switch 94 to a value corresponding to the motor current. Then when the switch 94 is open, the change is stored on the capacitor 100; there being very low leakage through the very high input impedance of the amplifier 98. Thus the amplifier 98 output will reflect the capacitor voltage. The comparator 46 is an operational amplifier which receives the outut from the amplifier 98 at its negative input terminal and receives instantaneous motor current signals from the filter 44 at its positive terminal. The comparator output is either high or low dependent on which input signal is greater. If the present motor current signal is greater than the just past signal from the amplifier 98 indicating increasing motor current, the output of comparator 46 will be high and if the motor current is decreasing the comparator output will be low. This digital signal is conditioned by a diode 102 having each side thereof connected to ground through a resistor 104.

The accumulator 49 is a presettable 16 bit up/down counter that receives eight clock pulses from pulse train B following each accumulator reset pulse in pulse train D. The accumulator reset is a preset enable pulse that automatically resets the counter to a programmed state which corresponds to the number seven. With this preset count of seven, the eight clock pulses will cause the counter to count up or down from seven depending on the input signal from the output of comparator 46. After the eight counts have been accumulated, the state of the counter will be either above or below eight depending on the majority of up or down signals from the comparator 46. The accumulator output registers a logic "one" or "zero" corresponding to increasing or decreasing motor current trend respectively over the time interval including the eight clock pulses. This trend indication is then fed to the decision network 50.

The decision network 50 is a logic circuit comprising five NAND gates and a JK flip-flop. The binary trend signal is fed to both inputs of a NAND gate 106, the output of which is fed to an input each of NAND gates 108 and 110. The output of gate 108 is fed to both inputs of NAND gate 112; similarly the output of gate 110 is fed to the inputs of NAND gate 114. The outputs of the gates 112 and 114 are fed to the J and K inputs respectively of a flip-flop 116. The Q output of the flip-flop 116 is fed back via line 118 to an input of the NAND gate 110 while the $\overline{Q}$ output of the flip-flop is fed back via the line 120 to the input of NAND gate 108. The flip-flop stores the previous decision of the network 50 so that either line 118 or line 120 is energized at a high state. The operation of the network is such that when a one logic signal indicating an increasing trend is present at the accumulator output, the flip-flop 116 maintains its previous state indicating that the next change in the resistance value of the gain network 58 should be in the same direction as the previous change. When, however, the accumulator output is at zero logic state, the flip-flop output will change states indicating that the next change in the gain network 58 should be in a direction opposite to that in the previous change. Thus the gain network is caused to change resistance in one direction so long as increasing motor current trend prevails but when the trend turns downward, then a change in direction in the gain network is requested. It will be seen when the system is operating at a point remote from the peak, the signals from the decision network will request changes in the gain network which are in the same direction and which will cause an increasing trend of motor current until the peak is just surpassed and a downward current trend is detected. On the other hand, when the system is operating near the peak of the curve, the output of the decision network will alternate from one state to another so that the system operation will continuously change from one side of the peak to the other but always remain near the peak. A clock input to the flip-flop 116 controls the timing of flip-flop changes according to the pulse train C.

The up/down counter 52 receives the Q output signal of the decision network on line 118 and determines which resistance value of the resistor gain network 58 will be selected. Binary output signals are carried on the lines 122, 124 and 126 to the multiplexer 56. The multiplexer (e.g. Siliconix DG503) is an eight channel analog switch with a binary input-decoder that translates the binary output of the counter 52 into a decimal number and closes an associated decimal coded switch. These decimal coded switches then selectively connect resistors in the resistor gain network 58 into the feedback loop of the operational amplifier 32 via lines 38 and 40 to change the gain of the operational amplifier in finite steps and thereby change the wheel slip limit of the associated control circuitry. Thus as a decision is made by the decision network at the time of the leading edge of a pulse C, that decision is presented to the counter 52 and shortly thereafter the leading edge of pulse E enables the counter to register the pulse to change the binary coded outputs on lines 122, 124 and 126. When the signal on line 118 is at a logic one level, binary output code increases and when it is at a zero level, binary output code decreases at the clock pulse E.

In the illustrated embodiment there are only four resistors in the resistor gain network 58 so that there are only five possible output resistance values on lines 38 and 40. It is then necessary to limit the binary output of the counter 52 to values representing five desired resistance levels and to inhibit any attained excursion beyond this range. For that purpose the limit logic circuit 54 is provided which circuit comprises two NOR gates and three NAND gates. Line 122 is connected to an input of a NOR gate 128, line 124 is connected to an input of a NOR gate 130 and line 126 is connected to an input of NOR gate 128 and an input of a NAND gate 132. The line 118 is connected to inputs of NOR gate 130 and NAND gate 132. The outputs of NOR gates 128 and 130 form the inputs of a NAND gate 134, while the outputs of NAND gates 132 and 134 form the inputs of a NAND gate 136. The output of NAND gate 136 feeds the inhibit terminal of the counter 52. An analysis of the limit logic circuit 54 reveals that when the counter 52 is at its lowest logic state and outputs on lines 122, 124 and 126 are at zero logic level and the line 118 is also at a zero logic level, (requesting a further decrease in the counter state), the NAND gate 136 output will be at a one logic level which inhibits a change in counter state. When the counter indicates a level of four, i.e. lines 122 and 124 are at zero logic state and line 126 is at a one logic state and the line 118 is at one logic state (requesting a further increase in the counter state), an inhibit signal will be emitted by the NAND gate 136 to prevent such a change. In addition, during the last mentioned condition, the NAND gate 132 will have a zero logic level which is fed to an enable input of the multiplexer to disable the multiplexer but during all other conditions of the desired operating range, the NAND gate 132 has a one logic level to enable the multiplexer. Of course more or fewer resistors could be used in the resistor gain network 58 and the limit logic network could be adjusted to provide appropriate limits for the available range.

The control pulse network 138 comprises the elements 62 through 68 shown in FIG. 4 and involves conventional circuitry not requiring further description.

The overall operation of the current maximizer involves summing the motor current signals 28, filtering the sum thereof, sampling the value of that signal during the down pulse of pulse train A when the switch 94 is closed and holding that value during the up pulse of A. That memorized value is continually compared with the motor current signal from the filter 44 by the comparator 46 and the binary result of the comparison is fed to the input of the up/down counter or accumulator 49. At the rise of each pulse B, the counter 49 registers the output of the comparator 46 to determine whether the motor current trend is increasing or decreasing during that time period. This operation is repeated for a time interval covering eight periods and then the accumulated trend is sampled by the decision network 50 at the rising portion of pulse C. If the trend indicates increasing motor current, the output of the decision network 50 remains the same as its previous decision so that the counter 52 is stepped during the rise portion of pulse E in the same direction as its previous change. The multiplexer 56 then alters the resistance of the resistor gain network 58 in conformity of the new state of counter 52. When the accumulator output shows a decreasing motor current trend, the output of the decision circuit changes state causing the counter 52 to step in the opposite direction causing a corresponding change in the resistor gain network 58. The limit logic circuit 54 meanwhile prevents changes in the counter output which exceed the limits of the resistor gain network.

It must be seen that the current maximizer according to this invention allows a control signal in a feedback circuit to be brought to and maintained at or near the maximum value of the control signal which occurs within the operating range of the controlling signal. It is obvious that by a minor change in the logic circuit, the same arrangement can be used to seek the minimum value.

The embodiments of the invention in which an exclusive property or privilege is claimed are defined as follows:

1. In a feedback control circuit for controlling a device by a controlling signal in which a controlled parameter of the device is variable in response to changes of the controlling signal and has a maximum value within the range of the controlling signal, a circuit for maximizing the controlled parameter comprising:
   means for providing an input signal proportional to the controlled parameter,
   a sample and hold circuit for memorizing the input signal for each of several time periods,
   a comparator responsive to the input signal and to the memorized signal for comparing them and producing a binary output indicating increase or decrease of the input signal over each time period, an up-down counter responsive to the comparator output for accumulating the output indications over a time interval comprising said several periods and producing a binary trend signal for each interval indicating an increasing or decreasing trend of the input signal, a decision network comprising a logic circuit responsive to the trend signal for providing decision signals for initiating change of the controlling signal in one direction of the input signal, for initiating a further change in the same direction when the trend signal indicates an increasing trend, and for initiating a change in the opposite direction when the trend signal indicates a decreasing trend, and means responsive to the decision signal from the decision network for effecting a change in the controlling signal according to the decision signal.

2. In a feedback control circuit for controlling a device by a controlling signal in which a controlled parameter of the device is variable in response to changes of the controlling signal and has a maximum value within the range of the controlling signal, a circuit for maximizing the controlled parameter comprising:

means for providing an input signal proportional to the controlled parameter, a sample and hold circuit for memorizing the input signal for each of several time periods, a comparator response to the input signal and to the memorized signal for comparing them and producing a binary output indicating increase or decrease of the input signal over each time period, an up-down counter responsive to the comparator output for accumulating the output indications over a time interval comprising said several periods and producing a binary trend signal for each interval indicating an increasing or decreasing trend of the input signal, a decision network comprising a logic circuit responsive to the trend signal for providing decision signals for initiating change of the controlling signal in one direction of the input signal, for initiating a further change in the same direction when the trend signal indicates an increasing trend, and for initiating a change in the opposite direction when the trend signal indicates a decreasing trend, a second up-down counter responsive to the decision signals from the decision network for registering the decision signals on a cumulative basis and providing a plurality of binary outputs corresponding to the state of the counter, and a circuit responsive to the plurality of binary outputs for effecting changes in the controlling signal in accordance with changes in the binary outputs.

3. In combination:

an apparatus having an operating parameter that responds to the value of an input and continuously varies in relation to an optimum value at some point in a range of input values;

first means effective to repetitively vary the input value within said range and progressively in a single direction over a predetermined range, such variation being in one direction in response to a first control signal and in the opposite direction in response to a second control signal;

second means responsive to the direction of variation of the operating parameter due to the variation of input value effected by said first means during one interval while under control of one of the control signals, and;

means effective for the succeeding interval to apply the said one control signal to the first means if the direction sensed by said second means during the same interval indicates change in the operating parameter towards the optimum and to apply the other control signal to the first means if the direction sensed by said second means indicates change in the operating parameter away from the optimum.

4. In combination:

an apparatus having an operating parameter that responds to the value of an input and continuously varies in relation to an optimum value at some point in a range of input values;

first means effective to repetitively vary the input value within said range and progressively in a single direction over a predetermined range, such variation being in one direction in response to a first control signal and in the opposite direction in response to a second control signal;

second means responsive to the direction of variation of the operating parameter due to the variation of input value effected by said first means during one interval while under control of one of the control signals, the second means including means for sensing the direction of variation of the operating parameter in each of a plurality of time periods during the interval and for providing for each period an increase or decrease signal according to the direction of variation of the operating parameter, and means for comparing the relative number of the increase and decrease signals over the interval to determine the net direction of change of the operating parameter, and;

means effective for the succeeding interval to apply the said one control signal to the first means if the direction sensed by said second means during the same interval indicates change in the operating parameter towards the optimum and to apply the other control signal to the first means if the direction sensed by said last means indicates change in the operating parameter away from the optimum.

* * * * *